(12) United States Patent
Suzuki

(10) Patent No.: US 9,027,946 B2
(45) Date of Patent: May 12, 2015

(54) SUSPENSION DEVICE

(75) Inventor: Atsushi Suzuki, Atsugi (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/346,039

(22) PCT Filed: Aug. 6, 2012

(86) PCT No.: PCT/JP2012/069978
§ 371 (c)(1),
(2), (4) Date: Mar. 20, 2014

(87) PCT Pub. No.: WO2013/042468
PCT Pub. Date: Mar. 28, 2013

(65) Prior Publication Data
US 2014/0232084 A1    Aug. 21, 2014

(30) Foreign Application Priority Data

Sep. 21, 2011    (JP) ................. 2011-205961

(51) Int. Cl.
| B60G 11/14 | (2006.01) |
| B60G 9/00  | (2006.01) |
| F16F 1/12  | (2006.01) |
| B60G 15/06 | (2006.01) |

(52) U.S. Cl.
CPC ........ B60G 11/14 (2013.01); B60G 9/00 (2013.01); F16F 1/12 (2013.01); B60G 15/063 (2013.01); B60G 2202/312 (2013.01); B60G 2204/1242 (2013.01); B60G 2206/41 (2013.01); B60G 2206/426 (2013.01); B60G 2202/12 (2013.01)

(58) Field of Classification Search
USPC ............ 280/124.179, 124.155; 267/188, 189, 267/190, 195, 202
IPC ......................................................... B60G 9/00
See application file for complete search history.

(56) References Cited

U.S. PATENT DOCUMENTS

| 3,726,517 A    | 4/1973 | Lutz |
| 3,727,940 A    | 4/1973 | Hug |
| 4,249,645 A    | 2/1981 | Level et al. |
| 4,822,072 A    | 4/1989 | Preslicka et al. |
| 6,398,201 B1   | 6/2002 | Solomond et al. |
| 8,678,401 B2 * | 3/2014 | Wohlfarth ............. 280/6.157 |

FOREIGN PATENT DOCUMENTS

| DE | 2834528 A1 | 2/1980 |
| JP | 59-003033 U | 1/1984 |
| JP | 2001-001729 A | 1/2001 |

(Continued)

OTHER PUBLICATIONS

Communication with extended European search report dated Jan. 28, 2015 from corresponding European Application No. 12834228.4.

*Primary Examiner* — Faye M Fleming
(74) *Attorney, Agent, or Firm* — Young Basile

(57) ABSTRACT

A suspension device is provided with: a coiled spring which allows a vehicle body to elastically receive the vertical movement of a wheel and which is disposed at a position facing a side of the tire of the wheel; and a movement restriction section which is provided within the inner space of the coiled spring at a position facing the side of the tire and which restricts the movement of the coiled spring toward the tire.

14 Claims, 4 Drawing Sheets

(56) References Cited

FOREIGN PATENT DOCUMENTS

| | | |
|---|---|---|
| JP | 2005-282742 A | 10/2005 |
| JP | 2010-084776 A | 4/2010 |
| WO | 2014021111 A1 | 6/2014 |

\* cited by examiner

SUSPENSION DEVICE

CROSS REFERENCE TO RELATED APPLICATION

The present application claims priority to Japanese Patent Application No. 2011-205961, filed Sep. 21, 2011, and incorporated herein in its entirety.

TECHNICAL FIELD

The present invention relates to a suspension device having a coil spring disposed at a side of a tire.

BACKGROUND

In a suspension device of a vehicle, when a decrease in height of a hood of a vehicle body, for example, lowers an upper end position of a strut-type damper, a coil spring can be disposed at a side of a tire. In such a case, when the coil spring is broken, there arises a problem that the broken coil spring interferes with the tire.

In a suspension device described in Japanese Patent Application Publication No. 2010-84776, for example, a flange provided in a dust cover covering an upper part of a cylinder case of a strut-type damper is set to face between windings in a coil spring upper part, as a measure in case of coil spring breakage. In this case, the flange facing between the windings in the coil spring upper part prevents a spring piece positioned on the upper side after the coil spring breakage from falling.

SUMMARY

As described above, in the conventional suspension device, the flange provided in the dust cover is set to face between the windings in the coil spring upper part, as the measure in case of coil spring breakage. This leads to a problem of reduction in assembly workability.

Therefore, it is an object of a suspension device according to the present invention to implement a measure in case of coil spring breakage while ensuring good assembly workability.

In the suspension device according to the present invention, a coil spring is disposed so as to face a side of a tire, and a movement restriction section configured to restrict the movement of the coil spring toward the tire is provided within the inner space of the coil spring.

BRIEF DESCRIPTION OF DRAWINGS

The description herein makes reference to the accompanying drawings wherein like reference numerals refer to like parts throughout the several views, and wherein.

DESCRIPTION OF EMBODIMENTS

With reference to the drawings, embodiments of the present invention will be described below.

First Embodiment

Figure 1:
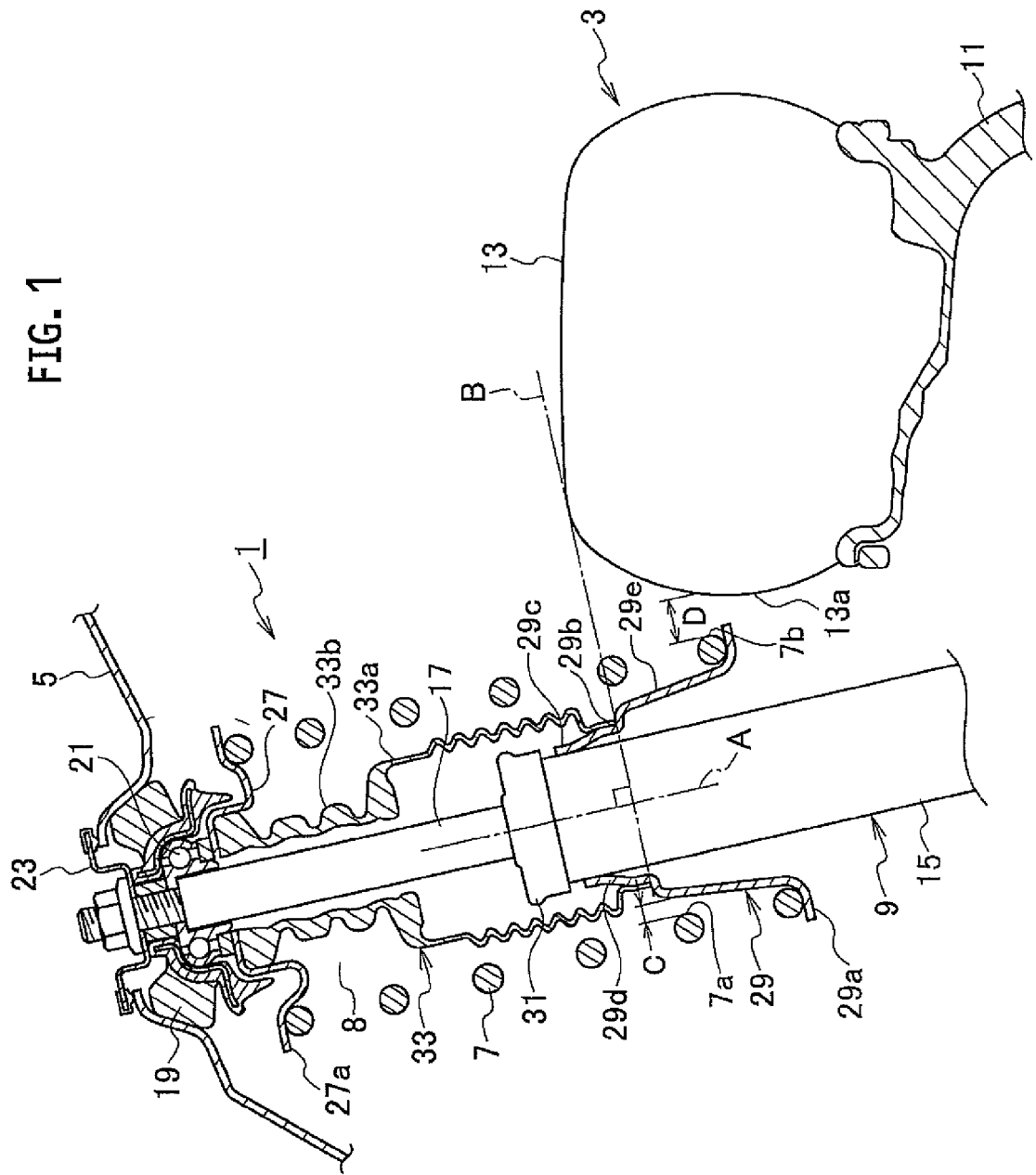
FIG. 1 is a cross-sectional view of a suspension device according to a first embodiment of the present invention.

FIG. 1 is a cross-sectional view of a suspension device 1 according to a first embodiment of the present invention. The suspension device 1 includes: a coil spring 7 configured to allow a vehicle body 5 to elastically receive the vertical movement of a wheel 3; and a strut-type damper 9 inserted into an inner space 8 of the coil spring 7 to damp the vertical movement of the wheel 3. A tire 13 is positioned on the outside (right-hand side in FIG. 1) in the vehicle width direction in the vicinity of a lower end of the coil spring 7. Here, the wheel 3 includes a wheel 11 on the inner circumferential side and the tire 13 attached on the outer circumferential side of the wheel 11.

The strut-type damper 9 includes a cylinder case 15 disposed on the lower side and a piston rod 17 protruding upward from an upper end of the cylinder case 15. The piston rod 17 is configured to be movable back and forth relative to the cylinder case 15. Also, the cylinder case 15 and the piston rod 17 are extended while being tilted with respect to the vertical direction. To be more specific, the cylinder case 15 and the piston rod 17 are tilted such that the piston rod 17 on the upper side is disposed on the inner side (left-hand side in FIG. 1) in the vehicle width direction than the cylinder case 15 on the lower side. In other words, a central axis A of the strut-type damper 9 including the cylinder case 15 and the piston rod 17 is tilted inward in the vehicle width direction toward the upper side.

A lower end of the cylinder case 15 is attached to an unillustrated knuckle housing for connecting the wheel 3, through an unillustrated bracket. Meanwhile, an upper end of the piston rod 17 is connected to a suspension attachment part 23 on the vehicle body 5 side through a bearing 21 and a strut mount 19 that is a connection member mainly made of a rubber elastic body. Note that the bearing 21 is disposed on the upper part of the piston rod 17.

Moreover, an upper spring seat 27 is attached below the bearing 21, while a lower spring seat 29 is attached near the upper part of the cylinder case 15. The coil spring 7 is provided between an outer circumferential side flange 27a formed on the outer circumferential side of the upper spring seat 27 and a seat part 29a formed at a lower end of the lower spring seat 29.

Also, a seal member 31 is attached to the upper end of the cylinder case 15 to seal between the upper end and an outer circumferential surface of the piston rod 17. Furthermore, a bump rubber (dust cover) 33 is provided from the upper part of the cylinder case 15 including the seal member 31 up to the upper part of the piston rod 17, so as to cover the outer circumferences of the cylinder case 15 and piston rod 17.

The bump rubber 33 includes: a large diameter part 33a covering the upper part of the cylinder case 15 including the seal member 31; and a small diameter part 33b covering the tip side lower than the upper spring seat 27 of the piston rod 17. Note that a step part 29b is formed in the upper part of the lower spring seat 29. The bump rubber 33 has a lower end of the large diameter part 33a come into contact with the step part 29b and has an upper end of the small diameter part 33b come into contact with a lower surface on the inner circumferential side of the upper spring seat 27.

The lower spring seat 29 is formed in a cylindrical shape extended roughly in the vertical direction, and a central axis thereof coincides with the central axis A of the cylinder case 15. An attachment part 29c at the upper end of the lower spring seat 29 is attached to the outer circumferential part of the cylinder case 15. A lower part of the attachment part 29c is formed into a slope part 29d whose inner diameter is gradually increased so as to be larger than that of the attachment part 29c. The step part 29b is formed below the slope part 29d.

Between the step part 29b and the seat part 29a, a bulging part 29e is formed as a movement restriction section. The bulging part 29e forms a tapered part whose inner diameter (outer diameter) is gradually increased from the step part 29b toward the seat part 29a.

Moreover, as shown in FIG. 1, a plane B approximately perpendicular to the central axis A at the upper end of the bulging part 29e forming the tapered part coincides with the upper end position of a side 13a of the tire 13. Furthermore, the bulging part 29e is provided at a position corresponding to one winding or more at the lower end side of the coil spring 7.

A distance between an upper end of the bulging part 29e, which has the smallest outer diameter, and an inner circumferential part 7a of the coil spring 7, which faces the upper end of the bulging part 29e in the direction perpendicular to the central axis A, is set as C. Also, a distance between an outer circumferential part 7b in a portion coming into contact with the seat part 29a at the lower end of the coil spring 7 and the side 13a of the tire 13, which faces the outer circumferential part 7b in the direction perpendicular to the central axis A, is set as D. The distances C and D have a magnitude relationship of C<D. In other words, the distance C is set to be smaller than the distance D. It is assumed here that the central axis A of the strut-type damper 9 coincides with a central axis of the coil spring 7 and a central axis of the lower spring seat 29.

Note that the bulging part 29e as the movement restriction section is provided in the lower spring seat 29, and the lower spring seat 29 is attached to the cylinder case 15. This also means that the bulging part 29e is provided in the strut-type damper 9 including the cylinder case 15.

Figure 2:
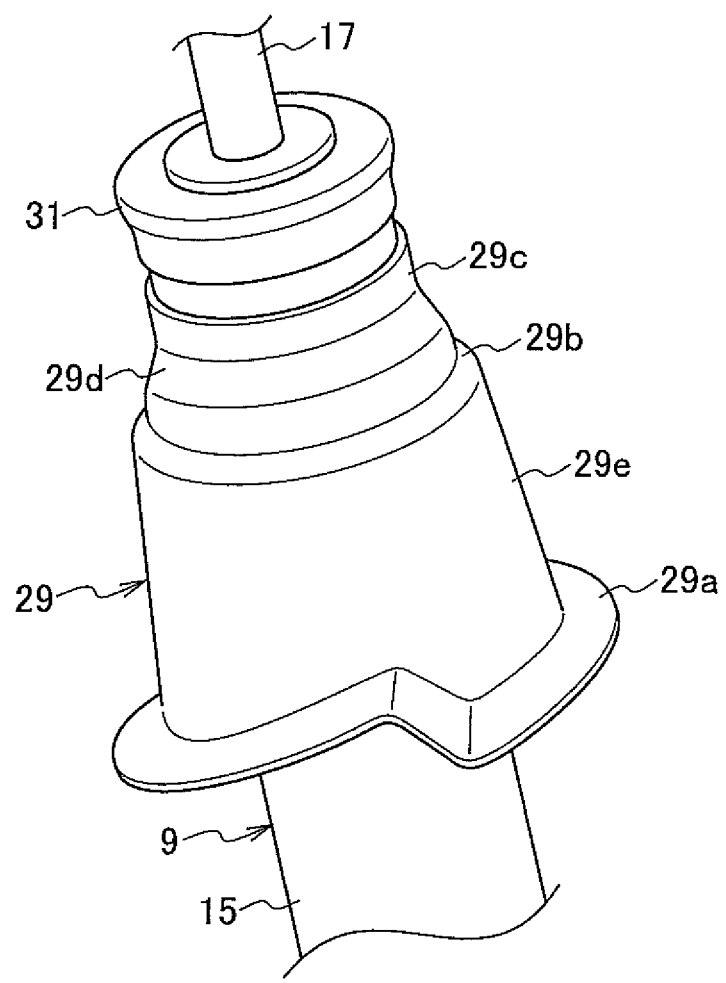
FIG. 2 is a perspective view around an area of a strut-type damper where a lower spring seat is attached in the suspension device shown in FIG. 1.

FIG. 2 is a perspective view around an area of the strut-type damper 9 in FIG. 1 where the lower spring seat 29 is attached. Note, however, that the coil spring 7 and the bump rubber 33 are omitted.

Next, operations will be described. The coil spring 7 may be broken due to peel-off of anticorrosive coating caused by collision with stones and the like or aging, and progression of deterioration due to rust generated in the peeled portion.

Figure 3:
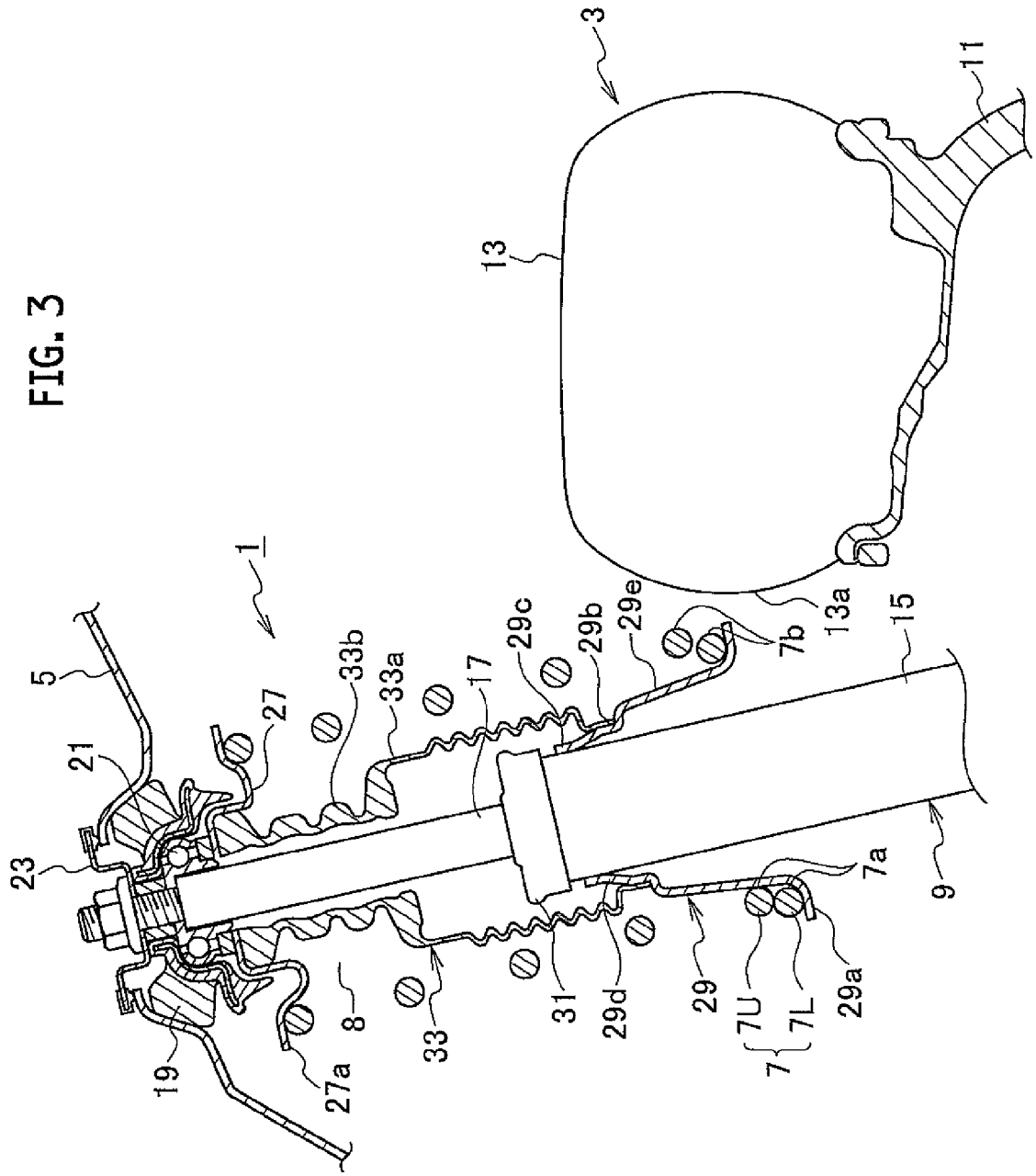
FIG. 3 is an operation explanatory view showing a state where a coil spring is broken in the suspension device shown in FIG. 1.

FIG. 3 shows a state where the coil spring 7 is broken. To be more specific, an upper broken spring 7U positioned in the upper part after the breakage is moved downward to come into contact with a lower broken spring 7L positioned in the lower part after the breakage, such that the upper broken spring 7U is placed on the lower broken spring 7L. In this event, a lower part of the upper broken spring 7U and the lower broken spring 7L (the upper and lower broken springs 7U and 7L will be hereinafter simply referred to as the broken spring) are located at a position corresponding to the bulging part 29e of the lower spring seat 29.

Accordingly, the bulging part 29e restricts movement of the broken spring toward the tire 13, and thus can prevent the broken spring from interfering with the side 13a of the tire 13. In other words, the broken spring is moved toward the tire 13 positioned on the right-hand side in FIG. 3, and the inner circumferential part 7a comes into contact with the outer circumferential surface of the bulging part 29e. Thus, the outer circumferential part 7b of the broken spring is set in a state of keeping a distance from the side 13a of the tire 13. As a result, the broken spring can be prevented from interfering with the side 13a of the tire 13.

To realize such a measure to prevent the broken spring from interfering with the tire 13, the bulging part 29e may be simply provided integrally with the lower spring seat 29. Therefore, it is no longer necessary to perform cumbersome work such as allowing the flange to face between windings in the coil spring upper part as in the conventional case. Thus, reduction in assembly workability can be suppressed.

Moreover, in this embodiment, the lower end of the coil spring 7 is supported by the lower spring seat 29 attached to the strut-type damper 9, and the bulging part 29e is provided integrally with the lower spring seat 29. Here, a relative position of the lower spring seat 29 in the vertical direction with respect to the tire 13 is basically not changed even when the suspension device 1 is moved up and down. Also, a relative position of the bulging part 29e in the vertical direction with respect to the tire 13 positioned on the side thereof is also maintained. Thus, an increase in the number of parts can be suppressed, since there is no need to separately provide a dedicated movement restriction section, while preventing the broken spring from interfering with the tire 13.

Also, in this embodiment, the lower spring seat 29 includes the seat part 29a supporting the lower end of the coil spring 7 and the attachment part 29c for attaching the upper end of the lower spring seat 29 to the strut-type damper 9. Moreover, the bulging part 29e is provided between the attachment part 29c and the seat part 29a. Thus, the bulging part 29e can be easily integrated with the lower spring seat 29.

The bulging part 29e is formed such that its diameter on the seat part 29a side is larger than that on the attachment part 29c side. Thus, movement of the broken spring toward the tire 13 is more surely restricted, and the broken spring can be more surely prevented from interfering with the side 13a of the tire 13.

In addition, in this embodiment, the bulging part 29e has the tapered part whose diameter is larger on the seat part 29a side than on the attachment part 29c side. Also, the plane B perpendicular to the central axis A at the upper end of the tapered part coincides with the upper end position of the side 13a of the tire 13. Thus, the broken spring can be prevented from interfering with the side 13a of the tire 13 even when the broken spring is moved in the direction approximately perpendicular to the central axis A in the vicinity of the upper end of the tapered part, which has the smallest outer diameter.

Moreover, in this embodiment, the bulging part 29e is provided at the position corresponding to one winding or more at the lower end side of the coil spring 7. Here, generally, a first winding of the coil spring 7 is likely to be broken. A leading portion up to the first winding from the lower spring seat 29 repeatedly comes into contact with the lower spring seat 29. This repeated contact causes the coating of the coil spring 7 to come off and makes the coil spring prone to breakage. To prevent this, the bulging part 29e is disposed at the position corresponding to at least the first winding where the coil spring is likely to be broken. Thus, the broken spring can be more surely prevented from interfering with the tire 13.

Furthermore, in this embodiment, the distance C between the inner circumferential part 7a of the coil spring 7 and the outer circumferential surface of the bulging part 29e of the lower spring seat 29 is set to be smaller than the distance D between the outer diameter part 7b of the coil spring 7 and the side 13a of the tire 13. Accordingly, even when the broken spring is moved toward the tire 13, the inner circumferential part 7a of the coil spring 7 interferes with the bulging part 29e of the lower spring seat 29 before the outer circumferential part 7b of the coil spring 7 interferes with the side 13a of the tire 13. Thus, the broken spring can be more surely prevented from interfering with the side 13a of the tire 13.

Also, in this embodiment, the strut-type damper 9 is adopted as the damper. Therefore, also in a vehicle equipped with the strut-type damper 9, the broken spring can be prevented from interfering with the side 13a of the tire 13 while suppressing reduction in assembly workability.

Furthermore, the strut-type damper 9 is provided on the front wheel 3. Therefore, also in a vehicle equipped with the strut-type damper 9 on the front wheel 3, the broken spring can be prevented from interfering with the side 13a of the tire 13 while suppressing reduction in assembly workability.

Note that, when the strut-type damper 9 is provided on the front side, the bulging part 29e needs to be provided across the whole circumference, in order to prevent interference with the tire 13 even in case of breakage of the coil spring 7 in any state of steering. On the other hand, when the strut-type damper 9 is provided on the rear side, the bulging part 29e does not have to be provided across the whole circumference, if structurally possible, and may be disposed at a position facing at least the side 13a of the tire 13.

Second Embodiment

Figure 4:
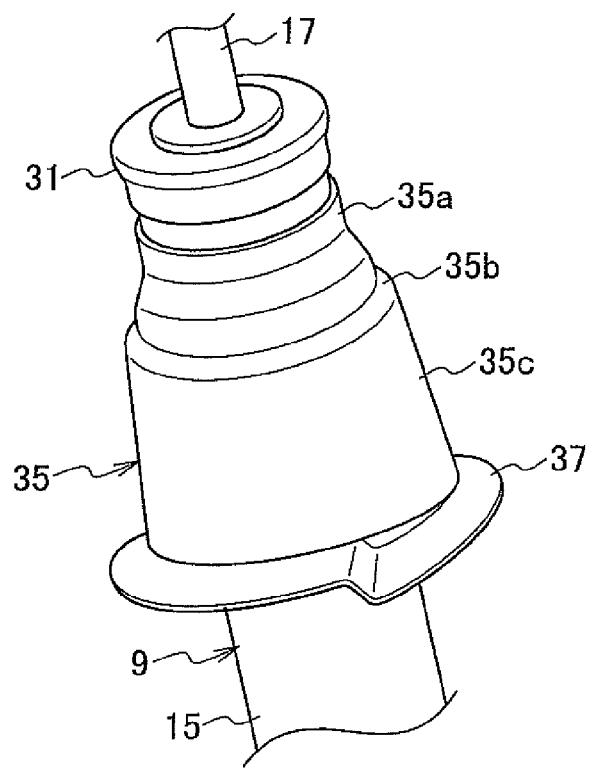
FIG. 4 is a perspective view corresponding to FIG. 2, showing a second embodiment of the present invention.

A second embodiment of the present invention is equivalent to the first embodiment shown in FIG. 2 except that the seat part 29a and bulging part 29e of the lower spring seat 29 are formed as separate members. In other words, in the second embodiment, as shown in FIG. 4, a spring movement restriction member 35 includes: an attachment part 35a attached to an outer circumferential part near a seal member 31 of a cylinder case 15 of a strut-type damper 9; a step part 35b which is positioned below the attachment part 35a and comes into contact with a lower end of a bump rubber 33 (FIG. 1); and a bulging part 35c which is positioned below the step part 35b and serves as a movement restriction section.

As in the case of the bulging part 29e in the first embodiment, the bulging part 35c forms a tapered part whose inner diameter (outer diameter) is gradually increased from the step part 35b toward the lower tip side. Also, a circular lower spring seat 37 is attached to the outer circumferential part of the cylinder case 15 of the strut-type damper 9 at a position almost in contact with the lower end of the bulging part 35c. The bulging part 35c and the lower spring seat 37 are formed in different members.

The bulging part 35c in the second embodiment described above is approximately the same in external shape as the bulging part 29e in the first embodiment shown in FIG. 2. Also, an attachment position thereof to the strut-type damper 9 is the one facing the side 13a of the tire 13. Therefore, also in the second embodiment in which the bulging part 35c is attached directly to the strut-type damper 9, the broken spring can be prevented from interfering with the side 13a of the tire 13 while suppressing reduction in assembly workability, as in the case of the first embodiment.

Third Embodiment

Figure 5:
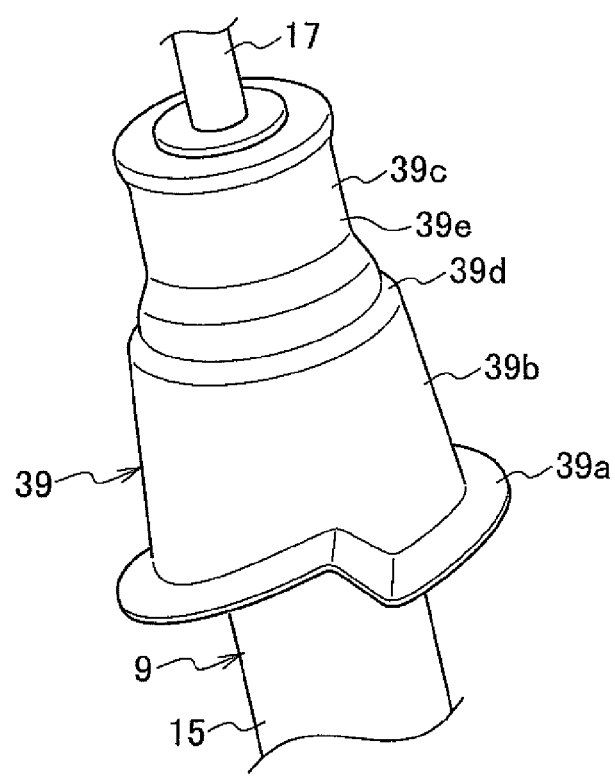
FIG. 5 is a perspective view corresponding to FIG. 2, showing a third embodiment of the present invention.

A third embodiment of the present invention is equivalent to the first embodiment shown in FIG. 2 except that the lower spring seat 29 and the seal member 31 are integrated together. In other words, in the third embodiment, as shown in FIG. 5, a lower spring seat 39 has a structure in which a seat part 39a, a bulging part 39b and a seal part 39c are integrated together.

The seal part 39c is formed so as to be extended downward longer than the seal member 31 in FIG. 2, and has its lower end continuous with a step part 39d which comes into contact with the lower end of the bump rubber 33 (FIG. 1). Therefore, here, a portion of the seal part 39c, which faces the outer circumferential surface of the cylinder case 15, serves as an attachment part 39e of the lower spring seat 39 to the strut-type damper 9.

As described above, according to the third embodiment, the strut-type damper 9 includes the cylinder case 15 and a piston rod 17 movable back and forth relative to the cylinder case 15. Also, the seal part 39c for sealing between the cylinder case 15 and the piston rod 17 and the bulging part 39b of the spring seat 39 are integrated together. Thus, as in the case of the first embodiment, no dedicated movement restriction section needs to be separately provided while preventing the broken spring from interfering with the tire 13. Moreover, there is no need to provide a dedicated part for the seal part 39c. Thus, an increase in the number of parts can be further suppressed.

According to the present invention, the movement restriction section restricts movement of the broken coil spring toward the tire. Thus, the broken coil spring can be prevented from interfering with the tire. Moreover, the movement restriction section is only simply provided within the inner space of the coil spring. Therefore, it is no longer necessary to perform cumbersome work such as allowing the flange to face between windings in the coil spring upper part as in the conventional case. Thus, reduction in assembly workability can be suppressed.

The invention claimed is:

1. A suspension device comprising:
   a coil spring configured to allow a vehicle body to elastically receive a vertical movement of a wheel, the coil spring including a lower end disposed to face a side of a tire of the wheel;
   a movement restriction section provided within an inner space of the coil spring in such a manner as to face the side of the tire and configured to restrict a movement of the lower end of the coil spring toward the tire; and
   a damper inserted into the inner space of the coil spring to damp the vertical movement of the wheel, wherein
   the lower end of the coil spring is supported by a spring seat attached to the damper, and
   the movement restriction section is provided in the spring seat.

2. The suspension device according to claim 1, wherein
   the spring seat includes a seat part to support the lower end of the coil spring and an attachment part to attach an upper end of the spring seat to the damper, and
   the movement restriction section is provided between the attachment part and the seat part.

3. The suspension device according to claim 2, wherein the movement restriction section has a diameter which increases from the attachment part toward the seat part.

4. The suspension device according to claim 2, wherein
   the movement restriction section includes a tapered part having a diameter which increases from the attachment part toward the seal part, and
   a plane perpendicular to a central axis of the coil spring at an upper end of the tapered part coincides with an upper end position of the side of the tire.

5. The suspension device according to claim 1, wherein the movement restriction section is provided at a position corresponding to one wind or more toward the lower end of the coil spring.

6. The suspension device according to claim 1, wherein a distance between an inner circumferential part of the coil spring and the movement restriction section is set to be smaller than a distance between an outer circumferential part of the coil spring and the side of the tire.

7. The suspension device according to claim 2, wherein the damper includes a cylinder case and a piston rod movable back and forth relative to the cylinder case, and
a seal member to seal between the cylinder case and the piston rod and the movement restriction section of the spring seat are integrated together.

8. The suspension device according to claim 2, wherein the damper is a strut-type damper.

9. The suspension device according to claim 8, wherein the strut-type damper is provided on a front wheel.

10. The suspension device according to claim 6, wherein the spring seat is positioned at the side of the tire.

11. A suspension device comprising:
a coil spring configured to allow a vehicle body to elastically receive a vertical movement of a wheel and disposed to face a side of a tire of the wheel;
a movement restriction section provided within an inner space of the coil spring to face the side of the tire and configured to restrict a movement of the coil spring toward the tire; and
a damper inserted into the inner space of the coil spring to damp the vertical movement of the wheel, wherein
a lower end of the coil spring is supported by a spring seat attached to the damper, the spring seat including a seat part to support the lower end of the coil spring and an attachment part to attach an upper end of the spring seat to the damper, and
the movement restriction section is provided in the spring seat between the attachment part and the seat part.

12. The suspension device according to claim 11, wherein the movement restriction section has a diameter which increases from the attachment part toward the seat part.

13. The suspension device according to claim 11, wherein the movement restriction section includes a tapered part having a diameter which increases from the attachment part toward the seal part, and
a plane perpendicular to a central axis of the coil spring at an upper end of the tapered part coincides with an upper end position of the side of the tire.

14. The suspension device according to claim 11, wherein the damper includes a cylinder case and a piston rod movable back and forth relative to the cylinder case, and
a seal member to seal between the cylinder case and the piston rod and the movement restriction section of the spring seat are integrated together.

* * * * *